(12) United States Patent
Stenersen et al.

(10) Patent No.: US 11,946,396 B2
(45) Date of Patent: Apr. 2, 2024

(54) LIQUID FILTER ARRANGEMENT FOR NO-MESS LIQUID CHANGE

(71) Applicant: Lubrication Technologies, Inc., Golden Valley, MN (US)

(72) Inventors: Eivind Stenersen, St. Paul, MN (US); Adam Sylvester, Golden Valley, MN (US); Matt Olund, Golden Valley, MN (US); Justin Brinkman, Minneapolis, MN (US)

(73) Assignee: LUBRICATION TECHNOLOGIES, INC., Golden Valley, MN (US)

( * ) Notice: Subject to any disclaimer, the term of this patent is extended or adjusted under 35 U.S.C. 154(b) by 0 days.

(21) Appl. No.: 17/469,826

(22) Filed: Sep. 8, 2021

(65) Prior Publication Data
US 2022/0074326 A1    Mar. 10, 2022

Related U.S. Application Data

(60) Provisional application No. 63/075,904, filed on Sep. 9, 2020.

(51) Int. Cl.
*B01D 35/30* (2006.01)
*B01D 27/08* (2006.01)
(Continued)

(52) U.S. Cl.
CPC ............ *F01M 11/03* (2013.01); *B01D 27/08* (2013.01); *F01M 1/10* (2013.01);
(Continued)

(58) Field of Classification Search
CPC B01D 35/153; B01D 29/21; B01D 2201/291; F01M 11/03
(Continued)

(56) References Cited

U.S. PATENT DOCUMENTS 3,557,957 A * 1/1971 Baldwin .............. B01D 35/147
                                                   210/443
4,422,861 A * 12/1983 Dusza .................. B01D 46/106
                                                   55/DIG. 35
(Continued)

FOREIGN PATENT DOCUMENTS

DE    29915843 U1    3/2001
DE    10100311 A1    7/2002
(Continued)

OTHER PUBLICATIONS

International Search Report and Written Opinion, from corresponding PCT application PCT/US2021/049686, prepared by the European Patent Office, dated Dec. 2, 2021.

*Primary Examiner* — Long T Tran
*Assistant Examiner* — James J Kim
(74) *Attorney, Agent, or Firm* — Holzer Patel Drennan

(57) ABSTRACT

An easily serviceable liquid filter assembly having a housing with a drain to provide draining of fluid (e.g., liquid) from the housing. The filter assembly has a fluid inlet to receive dirty fluid into the housing, a fluid outlet to expel filtered fluid from the housing, and a drain, when open, to expel unfiltered (dirty) fluid from the housing. By removing a cover from the housing, the filter element opens the drain so that all fluid in the housing can be directly collected or can flow into the oil pan to be collected with the fluid present in the pan. All fluid, now in the drain pan, can be drained and collected in a disposable container such as a plastic pouch, which can be recycled. The filter element can be removed from the housing via the removed cover.

18 Claims, 11 Drawing Sheets

(51) Int. Cl.
*F01M 1/10* (2006.01)
*F01M 11/03* (2006.01)
*F01M 11/04* (2006.01)

(52) U.S. Cl.
CPC ... *F01M 11/0408* (2013.01); *F01M 2011/031* (2013.01); *F01M 2011/0483* (2013.01)

(58) Field of Classification Search
USPC ........................................................ 210/232
See application file for complete search history.

(56) References Cited

U.S. PATENT DOCUMENTS

| | | | | |
|---|---|---|---|---|
| 4,732,678 | A | * | 3/1988 | Humbert, Jr. .......... B01D 27/06 210/493.1 |
| 5,679,122 | A | * | 10/1997 | Moll .................... B01D 46/523 55/497 |
| 6,159,260 | A | * | 12/2000 | Hammes ................ B01D 46/10 55/497 |
| 6,746,604 | B2 | | 6/2004 | Jainek |
| 6,936,161 | B2 | | 8/2005 | Wright et al. |
| 6,936,169 | B2 | | 8/2005 | Baumann et al. |
| 8,161,953 | B1 | * | 4/2012 | Mordukhovich .... B01J 20/3204 123/196 R |
| 8,920,649 | B2 | | 12/2014 | Loos |
| 8,999,163 | B2 | | 4/2015 | Honermann et al. |
| 9,044,698 | B2 | | 6/2015 | Ardes |
| 9,199,187 | B2 | | 12/2015 | Honermann et al. |
| 10,702,814 | B2 | | 7/2020 | Honermann et al. |
| 2006/0107639 | A1 | * | 5/2006 | Hamlin .................... B01J 20/14 55/498 |
| 2007/0131604 | A1 | * | 6/2007 | Nomura ............... B01D 36/001 210/321.89 |
| 2012/0261324 | A1 | * | 10/2012 | Ishikura ............... B01D 27/106 210/234 |
| 2013/0081990 | A1 | * | 4/2013 | Roesgen ................ B01D 35/30 210/232 |
| 2013/0228503 | A1 | | 9/2013 | Baumann et al. |
| 2019/0030471 | A1 | | 1/2019 | Fayolle et al. |
| 2019/0046904 | A1 | | 2/2019 | Noren et al. |

FOREIGN PATENT DOCUMENTS

| | | | | |
|---|---|---|---|---|
| EP | 1714688 | A1 | * 10/2006 | ........... B01D 35/147 |
| EP | 1714688 | B1 | 1/2008 | |
| EP | 3292901 | B1 | 5/2020 | |
| KR | 1020090052257 | A | 5/2009 | |
| WO | 199832517 | A1 | 7/1998 | |
| WO | 2004014515 | A1 | 2/2004 | |
| WO | 2008134494 | A2 | 11/2008 | |
| WO | 2009149706 | A2 | 12/2009 | |
| WO | 2019091979 | A1 | 5/2019 | |

* cited by examiner

LIQUID FILTER ARRANGEMENT FOR NO-MESS LIQUID CHANGE

CROSS-REFERENCE

This application claims priority to U.S. provisional application No. 63/075,904 filed Sep. 9, 2020 and entitled LIQUID FILTER ARRANGEMENT FOR NO-MESS LIQUID CHANGE, the entire disclosure of which is incorporated herein by reference for all purposes.

BACKGROUND

Liquid filters, such as oil filters, are common. Typically, every internal combustion engine includes an oil filter to filter contaminants from the engine oil.

In some designs, the "oil filter" is composed of a filter element sealed within a can-like housing. To change the filter element, the entire assembly (the filter element and the housing) are removed and replaced.

In other designs, the oil filter element is removable from its housing, and only the filter element is removed and replaced. Some of these designs, where the housing remains on the engine while the filter is replaced, include a drainage valve at the lower end (relative to the direction of action of gravity) of the housing by which the filter housing can be drained of oil when exchanging the filter element. Some of these draining filter arrangements are complex.

SUMMARY

This disclosure provides a simple, easily serviceable liquid filter assembly having a housing with a drain and a filter element removable and replaceable within the housing, the assembly providing a low-mess and even no-mess removal of the filter element. For an internal combustion engine, the liquid drained via the drain of the housing can be directed to the oil pan of the engine, from which it is eventually drain.

This disclosure provides a filter assembly having a housing comprising a canister and a cover, the canister having a fluid inlet, a fluid outlet, and a fluid drain, the fluid drain in or proximate a bottom of the canister. A filter element is removably present in the canister. When the cover is in a first position on the canister, the fluid drain is sealed, with no liquid access through the drain, and when the cover is in a second position, a fluid path to the fluid drain is opened or created.

As one example, the filter assembly has a housing having a filter element therein, the filter housing having a body or canister and a removeable cover, the canister having a fluid inlet, a fluid outlet, and a fluid drain proximate the bottom of the canister. The fluid drain provides a fluid pathway from the canister interior to an engine oil pan when the cover is at least partially removed from its engagement with the canister, but does not provide a fluid pathway from the canister when the cover is fully engaged with the canister.

This disclosure provides, in another example, a filter assembly having a housing comprising a canister and a cover, the canister having a fluid inlet, a fluid outlet, and a fluid drain, the fluid drain in a bottom of the canister. A filter element is removably present in the canister. A compression spring is positioned between a bottom of the filter element and the bottom of the canister. When the cover is in a first position on the canister, the fluid path to the fluid drain is closed, and when the cover is in a second position, the fluid path to the fluid drain is open. The fluid drain can be connected to an engine oil pan.

This disclosure provides, in another, a filter assembly having a housing comprising a canister and a cover, the canister having a fluid inlet, a fluid outlet, and a fluid drain, the fluid drain in a bottom of the canister. A filter element is in the canister. A compression spring is positioned between a bottom of the filter element and the bottom of the canister. When the cover is in a first position on the canister, the filter element compresses the spring and closes all fluid paths to the fluid drain, and when the cover is in a second position, the spring lifts the filter element and opens a fluid path to the fluid drain. The fluid drain can be connected to an engine oil pan.

This disclosure also provides, in another example, a filter assembly having a housing comprising a canister and a cover. A base plate is present in the canister, the plate having a plurality of apertures therethrough and a center perforated tube. A filter element is positioned on the base plate and surrounding the center perforated tube. A helical compression spring is positioned between the base plate and the bottom of the canister. The canister includes a fluid inlet into the canister, a fluid outlet out from the canister in-line with the center perforated tube, and a fluid drain proximate the bottom of the canister. When the spring is compressed, all fluid paths to the fluid drain are closed, but when the spring lifts the filter element, a fluid path to the fluid drain is opened. The fluid drain can be connected to an engine oil pan.

This disclosure also provides various methods. In one example, a method includes inputting dirty fluid (e.g., oil) into a filter assembly that includes a canister having a filter element therein; passing the dirty fluid through the filter element to provide a filtered fluid; removing at least some of the filtered fluid from the canister via an outlet; and after removing the filtered fluid, at least partially removing a cover from the filter assembly canister to drain any remaining dirty fluid and filtered fluid from the canister via a drain. In some implementations, the drain is directly fluidly connected to an engine oil pan.

In another particular example, a method includes inputting dirty fluid (e.g., oil) into a filter assembly that includes a canister having a filter element therein; passing the dirty, fluid through the filter element to provide a filtered fluid; removing at least some of the filtered fluid from the canister via an outlet; and after removing the filtered fluid, at least partially removing a cover from the filter assembly canister to have the filter element lifted by a spring, and draining any remaining dirty fluid and filtered fluid from the canister via a drain which may be directly fluidly connected to an engine oil pan.

Another method includes inputting dirty fluid into a filter assembly canister having a filter element therein; passing the dirty fluid through the filter element to provide a filtered fluid; removing the filtered fluid from the canister via an outlet; and after removing at least some of the filtered fluid, removing a cover from a filter assembly canister to open a fluid path for any remaining dirty fluid and filtered fluid from the canister to a drain which may be directly fluidly connected to an engine oil pan.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTION OF THE DRAWING

The described technology is best understood from the following Detailed Description describing various implementations read in connection with the accompanying drawing.

DETAILED DESCRIPTION

Figure 1:
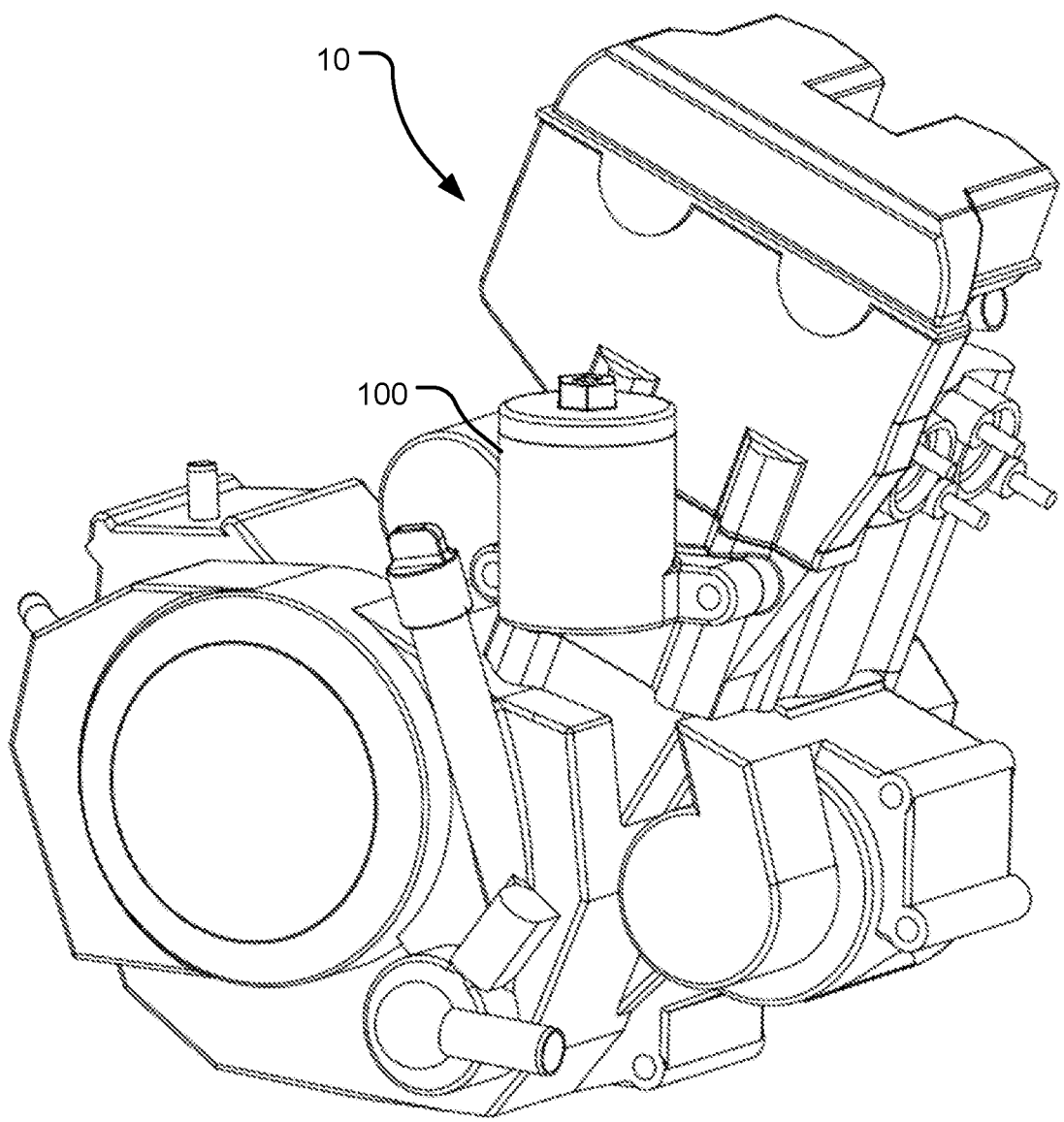
FIG. 1 is perspective view of an example engine having a filter assembly.

As indicated above, this disclosure provides an easily serviceable liquid filter assembly having a housing with a drain to provide draining of fluid (e.g., liquid, e.g., oil) from the housing. The filter assembly has a fluid inlet to receive dirty fluid into the housing, a fluid outlet to expel filtered fluid from the housing, and a drain, when open, to expel unfiltered (dirty) fluid from the housing. From the drain, the fluid can be directly collected and disposed or can flow into the oil pan of an internal combustion engine to be collected with the fluid present in the pan. This disclosure also provides a "quick change" or "no mess" oil change kit that can be used for fluid drained from the oil pan, e.g., with a quick connection fitting.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 shows an engine 10 into which is incorporated a filter assembly 100 according to this disclosure. The engine 10 may be any engine (e.g., an internal combustion engine such as for automobile, heavy equipment, power sport, marine, etc.) that utilizes a fluid therein. Commonly, an internal combustion engine has a lubricant therein, such as an "oil," which may be a petroleum product, a polymeric product, or combination thereof. After a certain amount of use of the engine, the lubricating oil needs to be changed, which typically involves draining the existing (dirty) oil and replacing it with new (clean) oil. Depending on the engine manufacture's recommendation and the use of the engine, the oil is changed yearly, seasonally, monthly, or often times even more frequently than monthly. As seen in FIG. 1, in this engine 10, the filter assembly 100 sits in a generally vertical orientation, having the filter element extending vertically (although not seen in this figure). In other designs, the filter assembly may be oriented with the filter element extending in a horizontal or other orientation.

Figure 2:
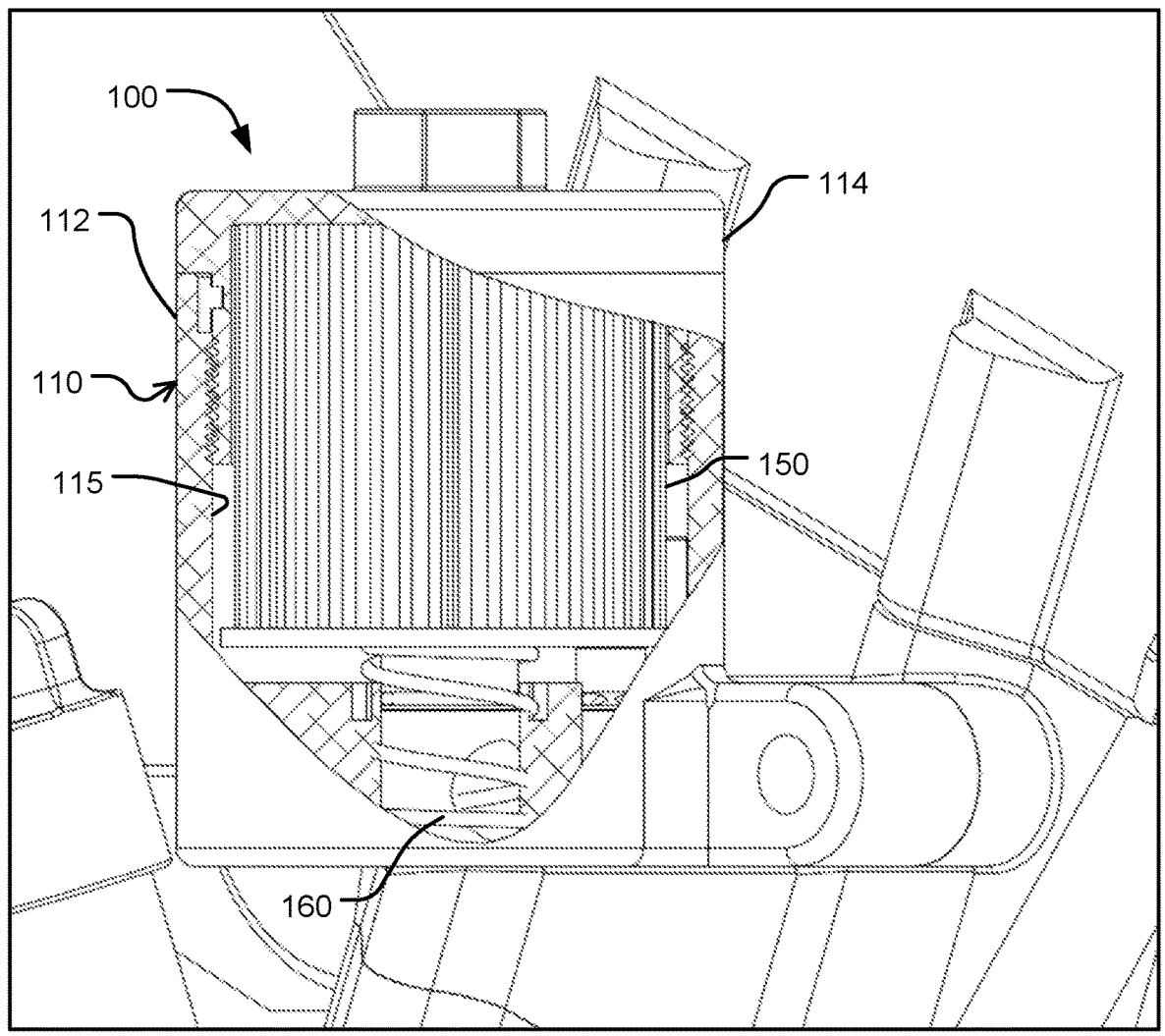
FIG. 2 is a side view of the filter assembly in a closed position.

FIG. 2 shows the filter assembly 100 having an overall shape and size determined by a housing 110 that includes a canister 112 and a cover 114. The housing 110 has an interior 115 in which is received a filter element 150, in this particular design, a pleated filter element. The filter assembly 100 can be referred to as a "top load" assembly, as the filter element 150 is accessed through the top of the housing 110 via the cover 114.

The housing 110 has a fluid inlet (not called out in FIG. 2) into the housing 110 to receive fluid from the engine 10 and a fluid outlet (not called out in FIG. 2) out from the housing to expel filtered fluid out from the housing back to the engine 10. The housing 110 also includes a drain (not called out in FIG. 2) to expel fluid out from the housing 110, whether filtered or not. In FIG. 2, the drain is closed, or sealed.

Also located within the interior 115 of the housing 110 is a spring 160, positioned at the opposite end of the cover 114, below the filter element 150. In FIG. 2, the spring 160 is compressed by the filter element 150, e.g., towards or against the bottom of the canister 112. The spring 160 may be a closed end compression spring; in other designs, other springs may be used, including those that are not helical.

The cover 114 of the housing 110 is removable and replaceable onto the canister 112 to provide access to the interior 115 and to the filter element 150. In FIG. 2, the cover 114 is fully engaged with the canister 112, in a fully closed position. A threaded engagement between the cover 114 and the canister 112 is seen in FIG. 2, having a plurality of fine threads. In other designs, there may be less threads, and/or coarse threads. In some designs, the engagement between the cover 114 and the canister 112 may be a quarter-turn or bayonet-style engagement. Other engagements are, of course, usable.

Figure 3:
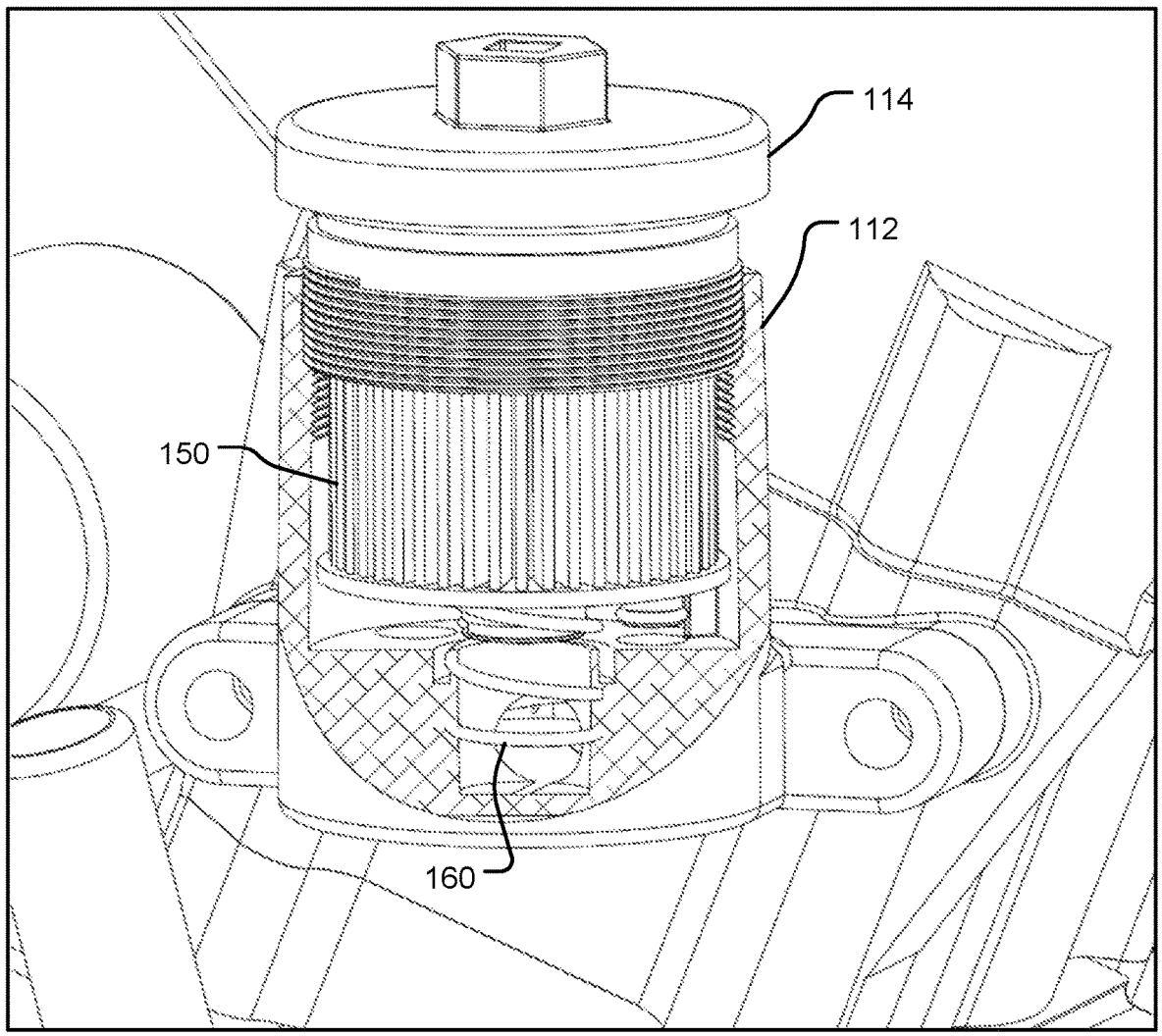
FIG. 3 is a side view of the filter assembly in a partially open position.

In FIG. 3, the cover 114 is removed from its fully closed position in relation to the canister 112. In FIG. 3, the cover 114 is fully disengaged from the canister 112, although in other implementations the cover 114 is removed from the fully closed position to be partially removed from the canister 112. With the cover 114 removed from the fully closed position, as in FIG. 3, the filter element 150 is in a higher position (e.g., a second position) than in FIG. 2 when the cover 114 is fully engaged. With the cover 114 released from the fully closed position, the spring 160 forces the filter element 150 upward, away from the bottom of the canister 112. With the filter element 150 moved away from the bottom of the canister 112, the drain is sufficiently open to allow for flow of any fluid in the canister 112, whether filtered or not, to drain out from the canister 112. It is the release of the cover 114 and the movement of the filter element 150 away from the drain that opens the drain, rather than any valve, spring, etc. or other mechanism from activating or moving. Additionally, having the filter element 150 in a raised position facilitates its removal from the housing 110, as discussed later. However, the filter element 150 does not need to be removed from the housing 110 to allow access to the drain; rather, only the cover 114 has to be released from the fully closed position.

Figure 4:
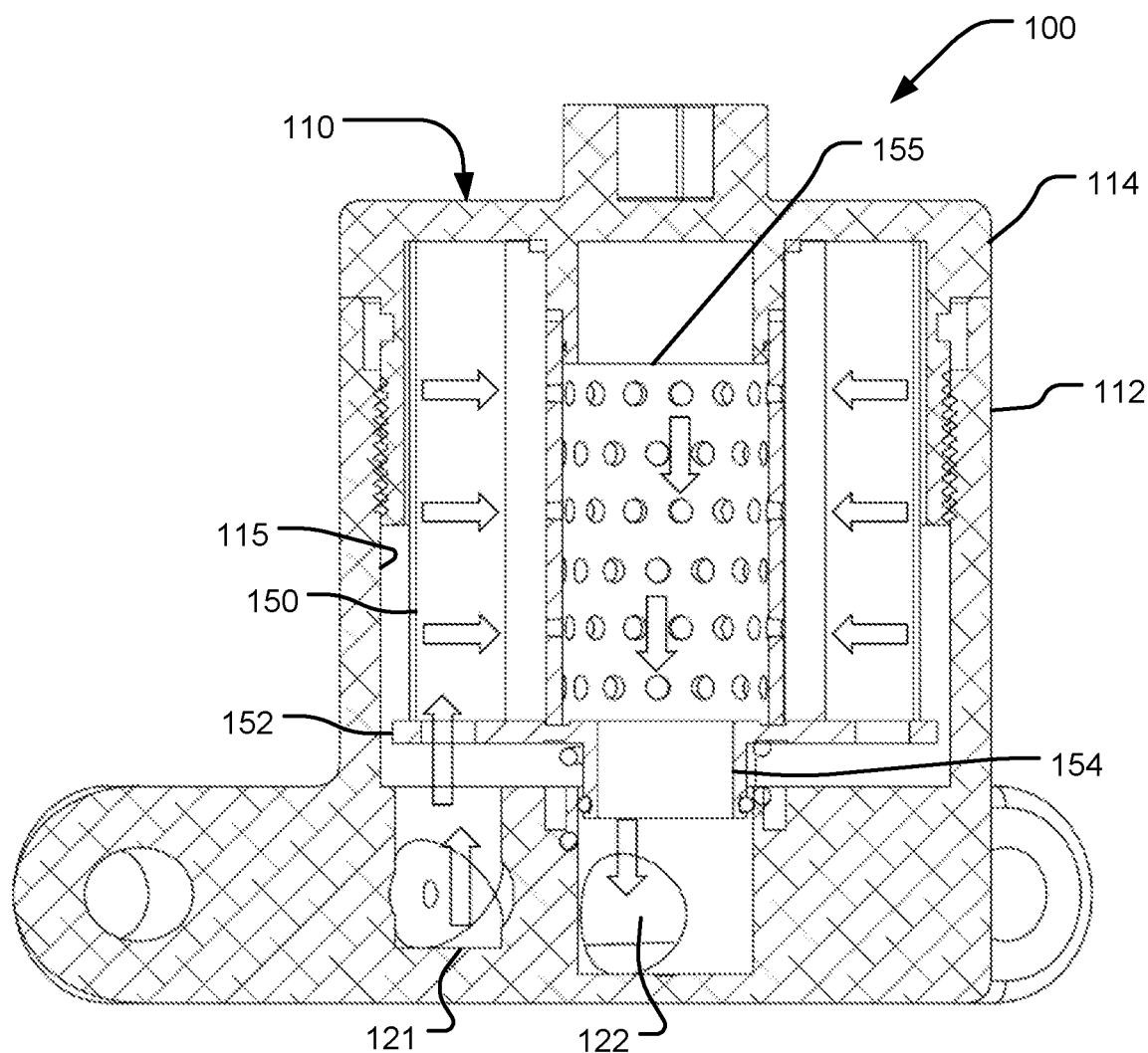
FIG. 4 is a cross-sectional side view of the filter assembly in the closed position.

FIG. 4 shows the location of the fluid inlet and the fluid outlet into the filter assembly 100, in particular, into the housing 110, as well as the fluid flow path through the filter element 150. In this particular design of the filter assembly 100, both the fluid inlet into the housing 110 and the fluid outlet out of the housing 110 are at or proximate the bottom of the housing 110 and the filter assembly 100; in other implementations, either or both the inlet and the outlet could be elsewhere, e.g., a fluid inlet could be in a side wall of the canister 112.

Used (dirty) fluid enters the interior 115 of the filter housing 110 via an inlet 121 at the bottom of the housing 110 or the canister 112; in other implementations, the inlet 121 may be positioned elsewhere in or on the canister 112. The dirty fluid passes through the filter element 150 in a generally radially-inward path, through the filter media to a central area (e.g., a center tube) present in the filter element 150. This central area may be defined by the filter itself (e.g., by the inner surface of the filter media of the filter element 150, e.g., by the inner ends of the pleats of a pleated filter element). Alternately, a center tube 155 may be present within the central area of the filter element 150. This center tube 155 may be aligned with a central axis of the canister 112 and/or the filter element 150. The center tube 155 may be part of the filter element 150 or may be separate therefrom. From the center tube, the now-filtered fluid flows downward out of the filter element 150 and then out of the canister 112 of the housing 110 via an outlet 122 centered below the filter element 150.

The center tube 155 extends from the central area of the filter element to a base plate 152 on which the filter element 150 resides. The base plate 152 may be adhered or otherwise connected to the filter element 150, or not. If not connected, the filter element 150 can be readily lifted off from the base plate 152, e.g., when replacing the filter element 150. Further, the center tube 155 within the filter element 150 may extend from the base plate 152; that is, it may be connected to the base plate 152, so that the filter element 150 resides on the base plate 152 aligned by the center tube 155. A central aperture is present in the base plate 152 aligned with the center tube 155 so that filtered fluid from the center tube 155 flows through the base plate 152.

Shown in FIG. 4, the base plate 152 or endcap of the filter element 150 has at least one additional aperture through which the dirty fluid passes from the inlet 121. In this particular design, the base plate 152 has multiple apertures spaced around the base plate 152, allowing the dirty fluid to pass longitudinally upward along and between adjacent pleats of the filter element 150 before radially passing through the filter media forming the pleats to the central area. A sufficient spacing exists between the bottom of the canister 112 and the base plate 152 to allow the dirty fluid to be laterally distributed across all regions of the base plate 152 and hence the pleats of the filter element 150.

In some designs, the base plate 152 has an outlet extension 154 that engages with the outlet 122 from the canister 112. The outlet extension 154 is tubular, having a hollow interior to allow the flow of filtered fluid therethrough; the outlet extension 154 is aligned with the center tube 155 and may be an extension of the center tube 155 on the opposite side of the base plate 152 from the center tube 155. In FIG. 4, the outlet extension 154 forms a radial seal with the outlet 122 of the housing 110 via an o-ring between the outlet extension 154 and the outlet 122. The spring 160 may be present around at least a portion of the outlet extension 154, or, at least a portion of the spring 160 may be present around the outlet extension 154.

Figure 5:
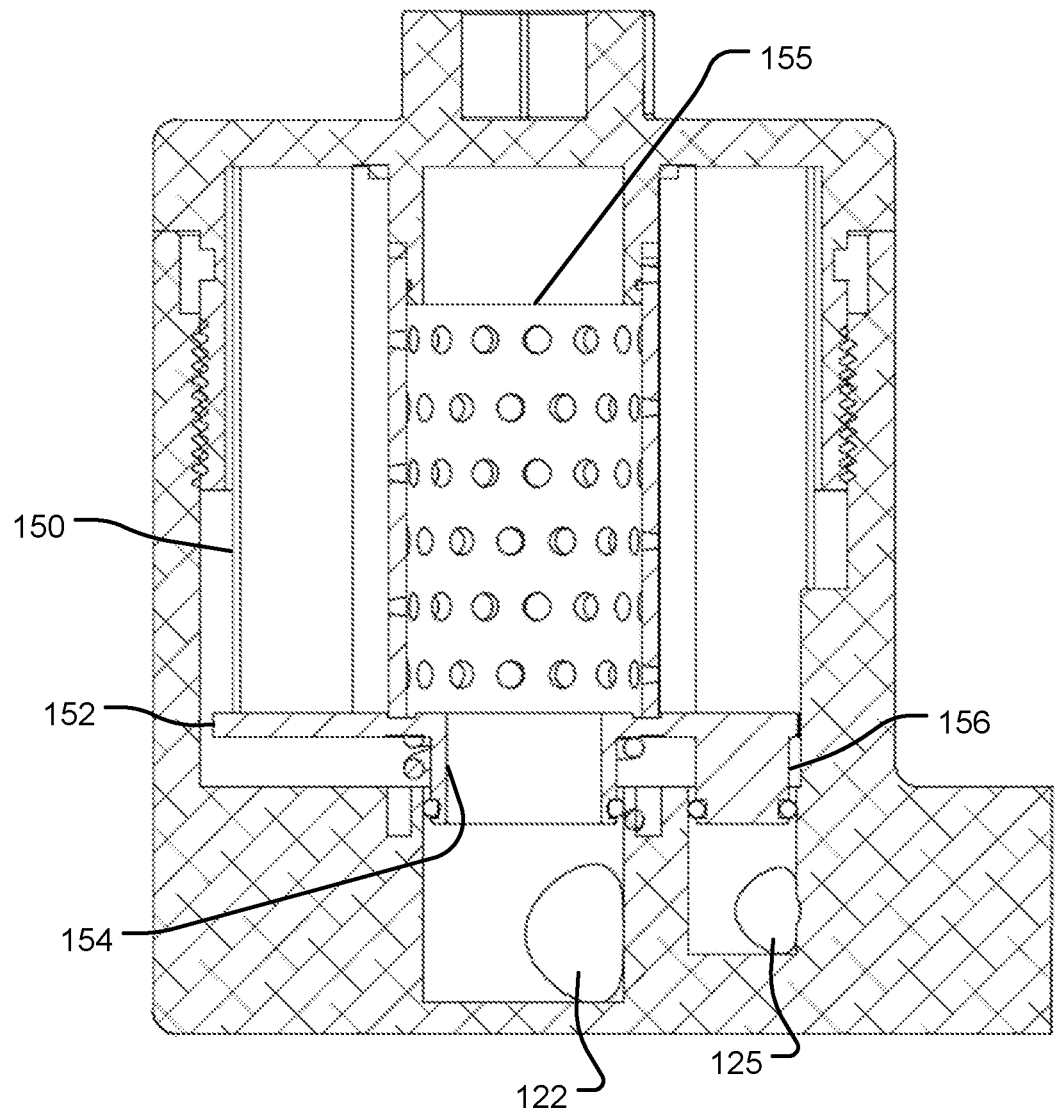
FIG. 5 is a cross-sectional side view of the filter assembly in the closed position taken at a different through-cut than FIG. 4.

The base plate 152 also includes a drain plug 156, seen in FIG. 5, that extends from the base plate 152 and engages with a drain 125 in the housing 110 from the canister 112. The drain plug 156 forms a radial seal with the drain 125 via an o-ring between the drain plug 156 and the drain 125. The drain plug 156 is preferably solid or at least a solid exterior surface, not allowing the flow of fluid therethrough.

This drain plug 156 is sized (in the longitudinal or axial direction) so that when the cover 114 is fully engaged with and on the canister 112 and the filter element 150 is down, the drain plug 156 seals the drain 125, allowing no fluid to enter the drain 125. When the cover 114 is not in the fully closed position but is at least partially removed, the base plate 152 with the drain plug 156 lifts up from the drain 125 due to the spring 160, thereby opening access to the drain 125. The drain plug 156 moves axially up-and-down, with the base plate 152, to open and close the drain 125.

The drain plug 156 may be any suitable length, e.g., 0.2 or 0.25 inch, or more, or less. When the filter element 150 is raised, as in FIG. 6, the drain plug 156 is longitudinally spaced from the drain 125, creating a fluid path for fluid from the interior 115 to flow into the drain 125. The drain 125 and the drain plug 156 are offset from the center axis of the filter element 150 and the canister 112; that is, the drain 125 and the drain plug 156 are not aligned with the center axis of the filter element 150 or the canister 112 or the outlet 122.

Figure 6:
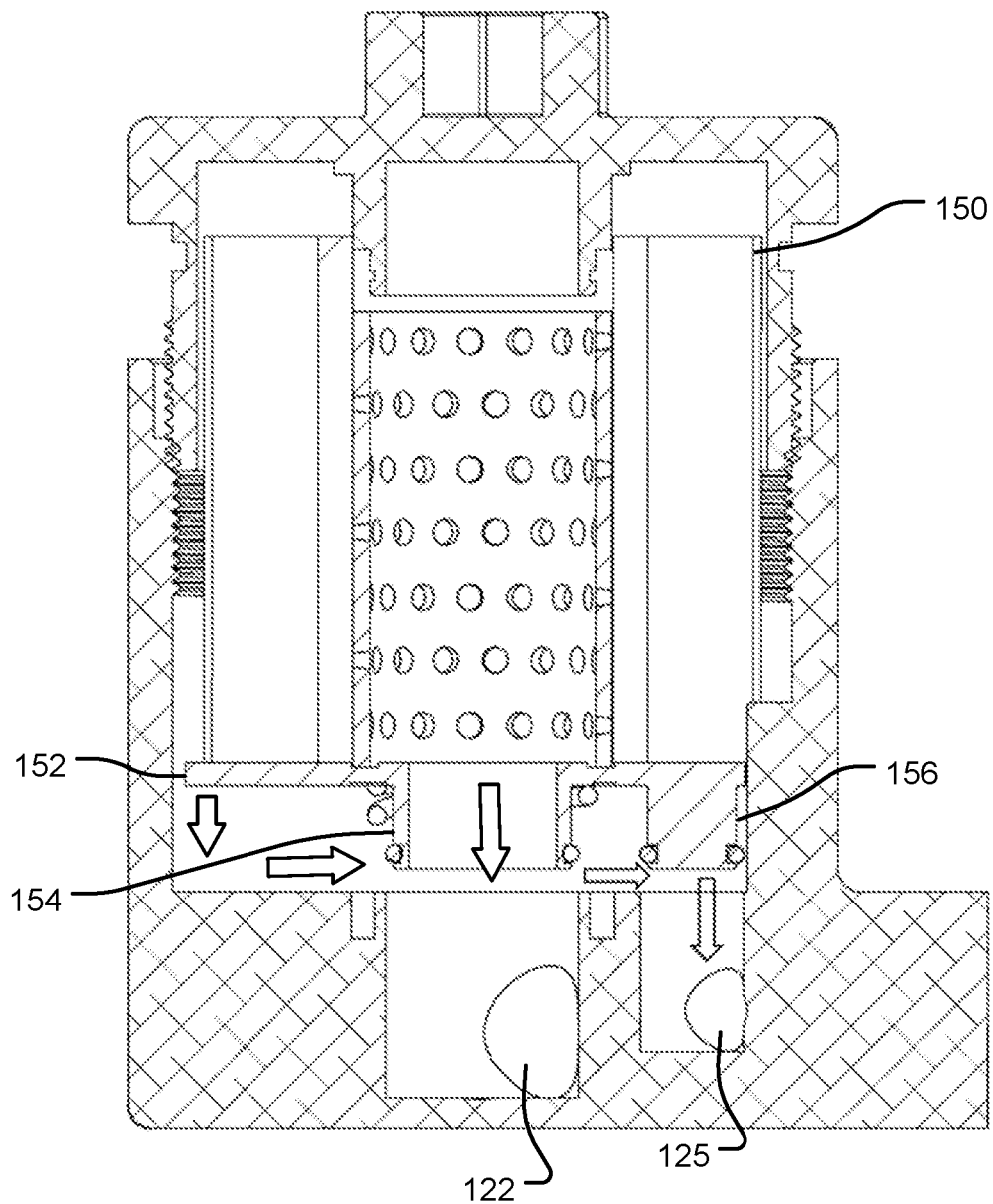
FIG. 6 is a cross-sectional side view of the filter assembly in a partially open position.

Additionally, when the filter element 150 is raised (e.g., 0.25 or 0.3 inch, or 0.5 inch, or more, or less) depending on the length of the outlet extension 154, as in FIG. 6, the outlet extension 154 is longitudinally or axially spaced from the fluid outlet 122, creating a fluid path for fluid from the interior 115 to flow into the outlet 122. In some implementations, the outlet extension 154 will be longer than the drain plug 156, so that the filter element 150 can be raised to open the drain 125 without opening the outlet 122.

In an alternate design, there may be no drain plug in the base plate 152, but rather merely an aperture in the base plate 152 aligned with the drain 125. In such a design, an o-ring would be positioned either around the aperture or the drain 125, providing an axial seal between the bottom of the base plate 152 and the surface of the canister bottom in which the drain 125 is formed.

Figure 7:
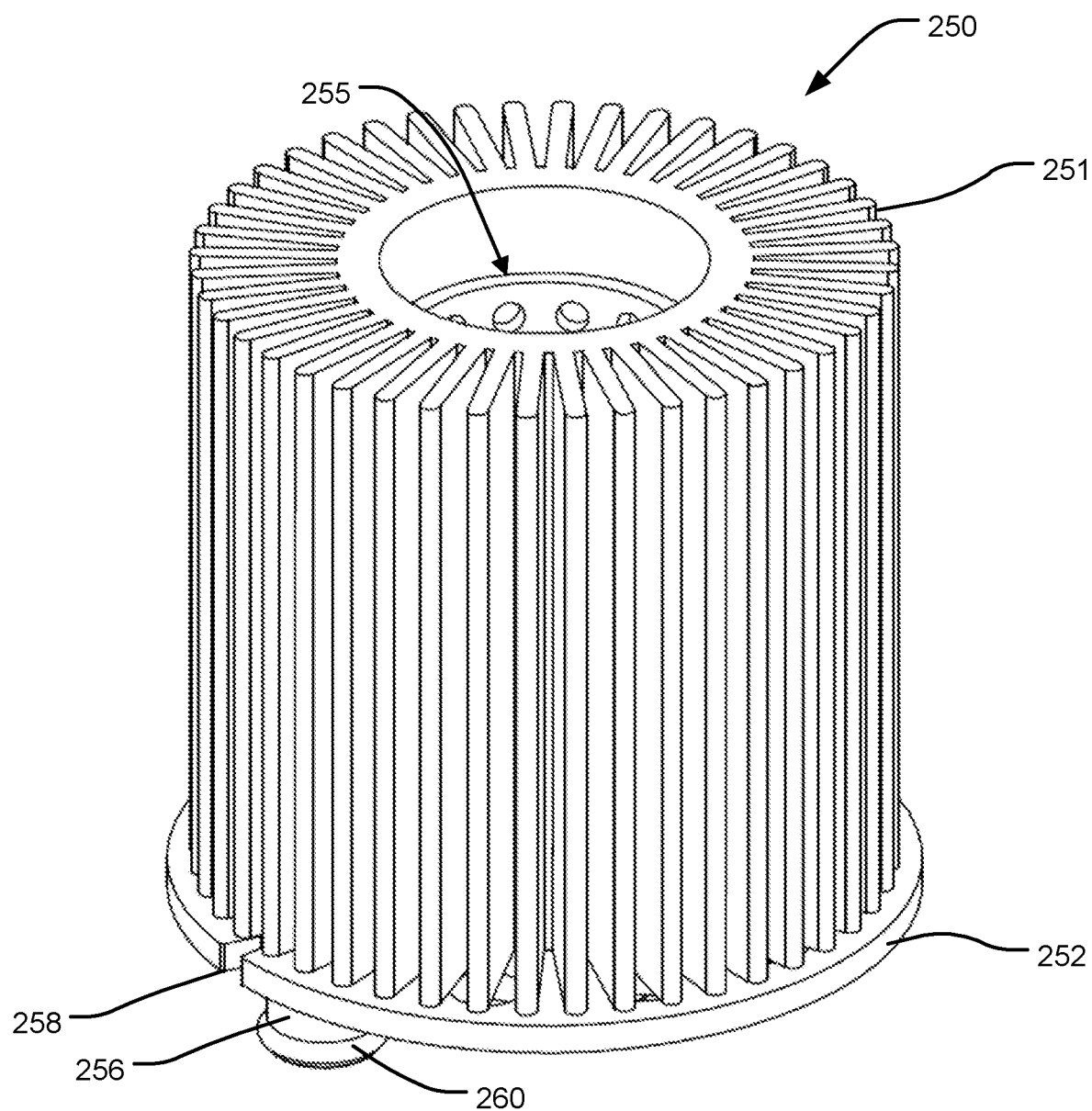
FIG. 7 is a perspective view of a filter element.

As indicated above, the filter element 150 may be any suitable filter. FIG. 7 illustrates a filter element 250 suitable to be used as the filter element 150 in the assembly 100.

The filter element 250 has a plurality of pleats 251 of media that extend longitudinally or axially in relation to the filter element 250. The pleats 251 define an outer diameter of the filter element 250 and an inner diameter of the filter element 250.

Present at the lower end of the pleats 251 is a base plate 252 that has a diameter that is greater than the outer diameter of the pleats 251 of the filter element 250; in alternate implementations, the base plate 252 may have the same diameter as the outer diameter of the pleats 251. A drain plug 256 having an o-ring 260, similar to the drain plug 156, is shown extending below the base plate 252.

At the center of the filter element 250 is an axially extending, perforated center tube 255. The center tube 255 may extend the entire axial length of the filter element 250 or it may be shorter.

In one particular design, the center tube 255 and the base plate 252 (including the drain plug 256) are a single piece separate from the filter element 250, so that the filter element 250 is removable off from the center tube 255 and the base plate 252. A spring (such as the spring 160) may also be part of the base plate 252 structure and may be located around an outlet extension (not seen in FIG. 7).

The particular pleated filter element 250 of FIG. 7 does not have integral (e.g., potted) end caps, but rather, the ends of the pleats 251 are sealed; that is, the two pieces of filter media (or one folded piece of filter media) forming a pleat are sealed (e.g., adhered) together at the top end of the pleat and at the bottom end of the pleat, so that unfiltered fluid must pass through the filter media prior to reaching the inner side of the pleats and the center tube 255. Such a filter construction is often referred to as "edge sealed pleats."

The filter media may be a pleated paper or other cellulosic, sheet-like material, and may include a polymeric component. The media may be high-loft or low-loft, and may have an outer layer of random fibers. The media may include any treatment or coating to affect the filtration properties.

Bicomponent fibers are useful in forming mechanically stable, but strong, permeable filtration media that can withstand the mechanical stress of the passage of debris laden fluid at high velocity and can maintain the loading of debris during use. The bicomponent fibers can be used in either high loft filter media or low loft filter media, and can be a core/shell (or sheathed) structure, side-by-side structure, islands-in-the-sea structure, or lobed structure. The bicomponent fibers are made up of at least two thermoplastic materials having different melting points. Thermoplastic polymers useful in forming either the core or the sheath of the bicomponent fibers useful in filter media include polyolefins such as polyethylene, polypropylene, polybutylene, poly-α-octene, and copolymers thereof including linear low density, low density, high density, ultra-high density; and other structural and compositional designations; polytetrahaloethylenes such as polytetrafluoroethylene and polychlorotrifluoroethylene; polyesters such as polyethylene terephthalate, polybutylene terephthalate, or polyethylene naphthalate; polyvinyl acetate, polyvinyl alcohol, and copolymers thereof; polyvinyl halides such as polyvinyl chloride, polyvinylidene halides such as polyvinylidene chloride, polyvinylidene fluoride, and the like and copolymers thereof; polyacetals such as polyvinyl butyral, acrylic resins (polyacrylates) such as polymethylacrylate esters and polymethylmethacrylate esters and copolymers thereof including copolymers of acrylic acid and salts thereof; polyamides such as nylon 6, nylon 66, nylon 6,10, nylon 46, and the like and copolymers thereof; polystyrene and copolymers thereof; polyurethanes; polyureas; cellulosic resins, namely cellulose nitrate, cellulose acetate, cellulose acetate butyrate, ethyl cellulose, and the like; copolymers of any of the above materials, such as ethylene-vinyl acetate copolymers, ethylene-acrylic acid copolymers, styrene-butadiene block copolymers, rubbers (e.g., KRATON rubbers), and the like. For example, a polyolefin/polyester sheath/core bicomponent fiber can be used, where the polyolefin sheath melts at a lower temperature than the polyester core. In other examples, two polyolefins, or two polyesters, two polyvinyl halide, two polyvinylidene halide, two polyimide polymers, or any other two polymers that are similar or identical chemically are used as core and sheath, wherein the composition, molecular weight, or morphological differences (e.g., degree of branching or degree of side chain crystallization) provide lower and higher melting or softening polymer materials. In some designs, the lower melting component of the bicomponent fibers is the sheath in a core/sheath structure.

Figure 8:
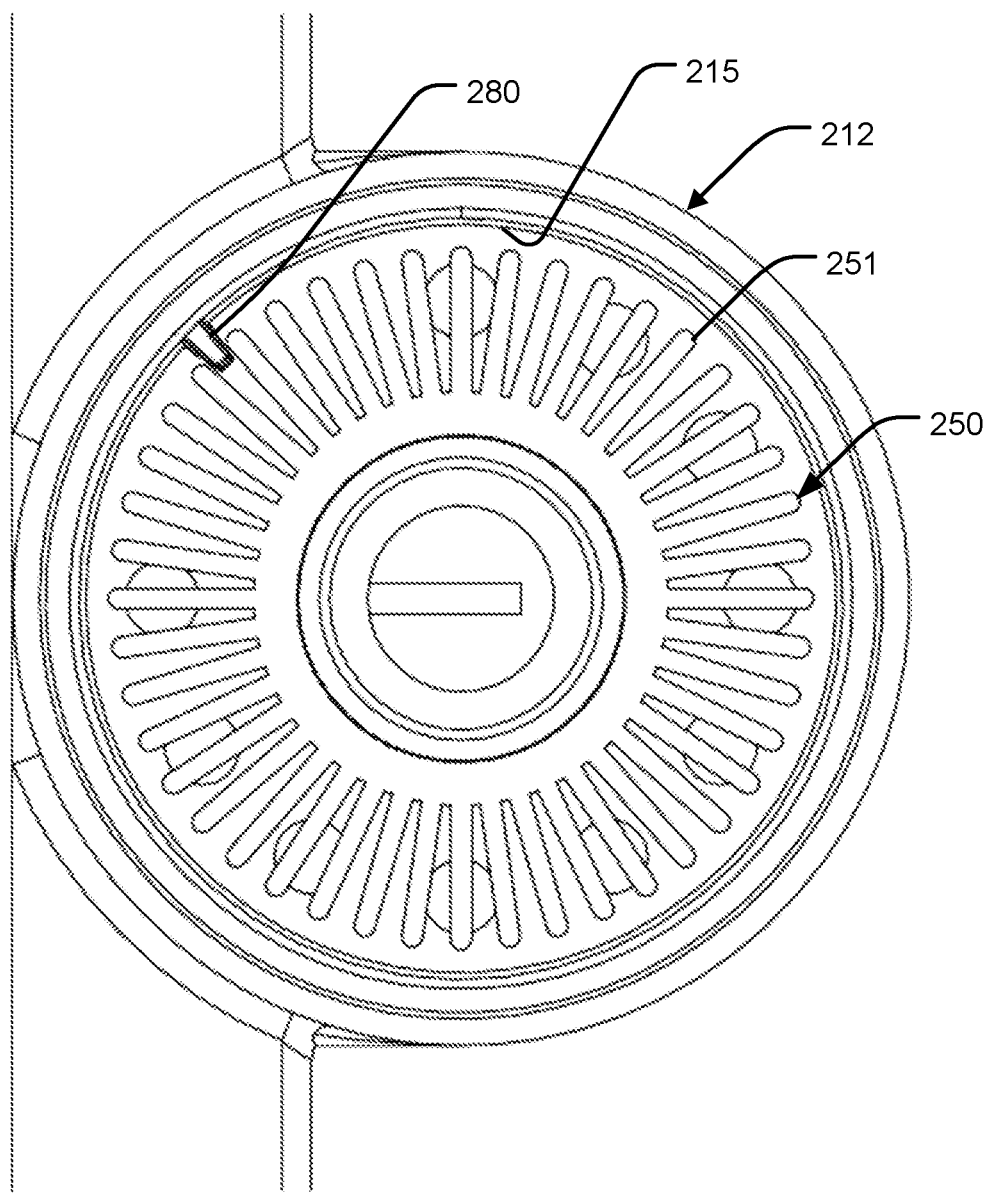
FIG. 8 is a top view of the filter element within a housing.

Returning to FIG. 7 and also referring to FIG. 8, in addition to having multiple apertures therethrough, the base plate 252 may include an alignment feature, such as a notch 258 in its outer periphery that engages with a protrusion 280 on an inner wall of the canister 212 of the housing, seen in FIG. 8. Such an alignment feature confirms the correct orientation of the base plate 252, particularly the drain plug 256, with the drain out of the canister 212. As seen in FIG. 8, the protrusion 280 rests or seats between adjacent pleats 251 of the filter 250 and will inhibit the filter element 250 from rotating.

Figure 9:
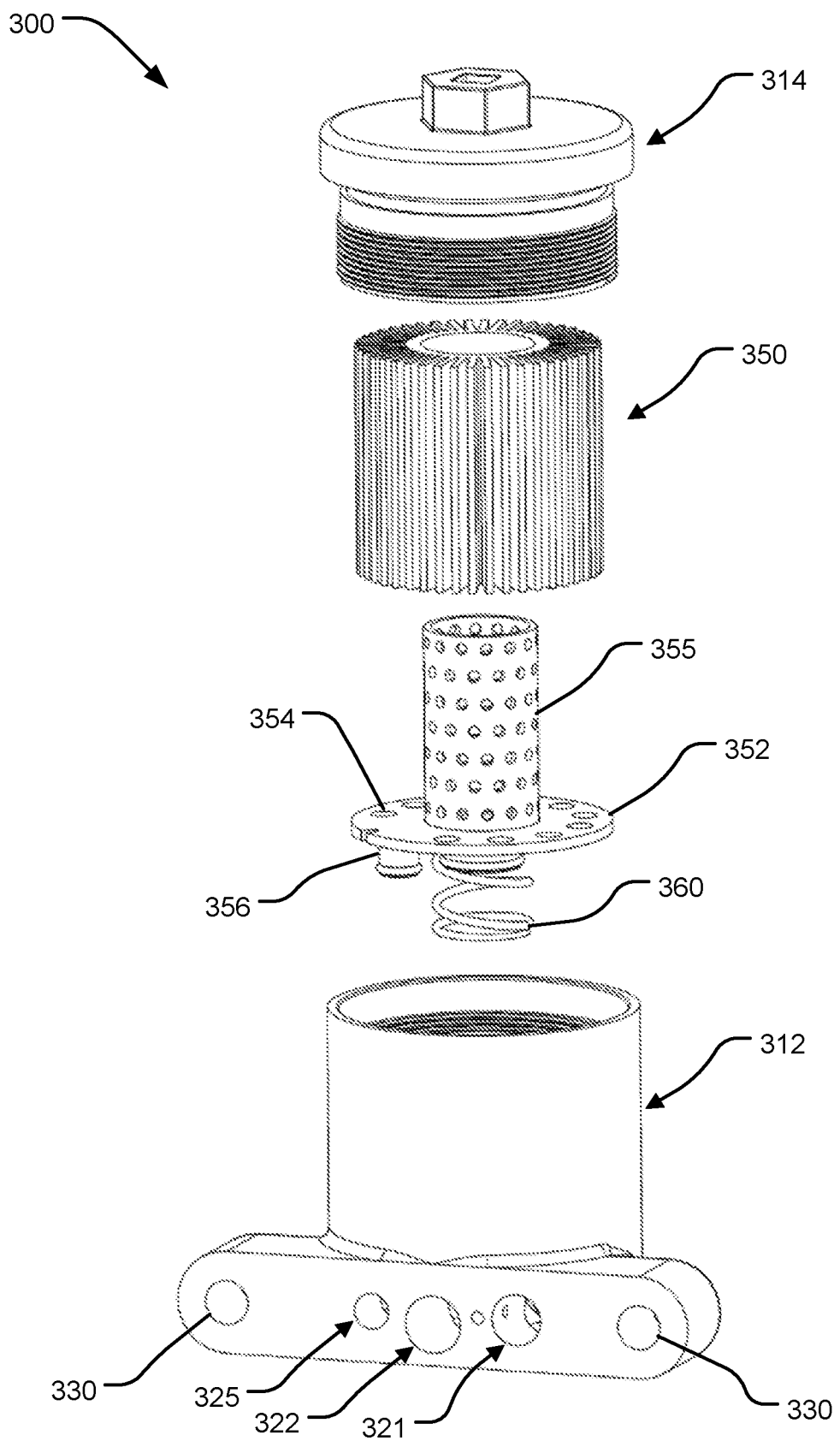
FIG. 9 is an exploded perspective view of another filter assembly.
Figure 10:
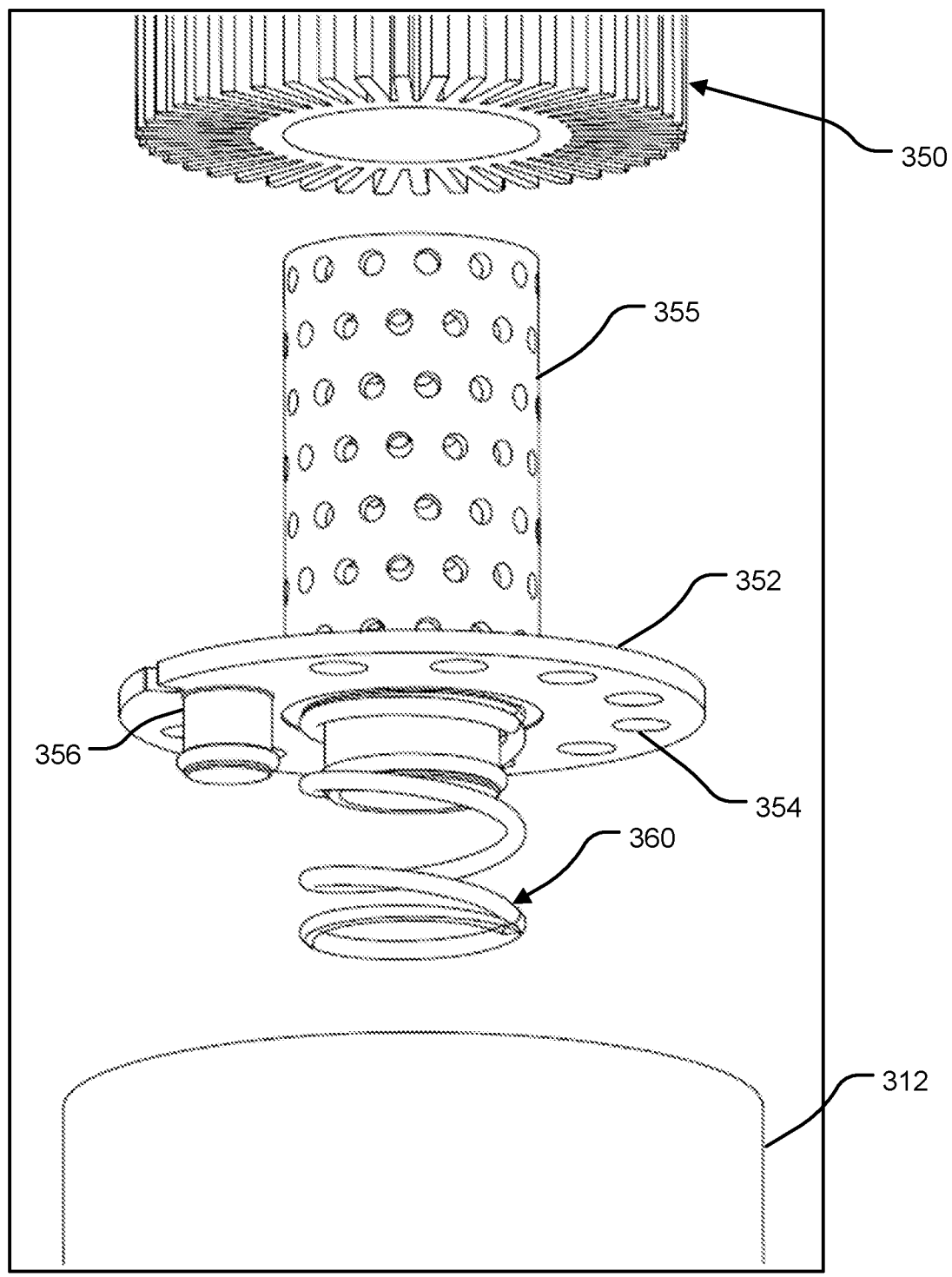
FIG. 10 is a close-up of the exploded perspective view of the filter assembly.

FIGS. 9 and 10 show another filter assembly 300; the features of the filter assembly 300 are generally similar to those of previous implementations, unless indicated otherwise.

In the filter assembly 300 of FIG. 9, the filter element is the only element or part that undergoes regular service; in other words, the filter element is the only regularly serviceable part. At some instances, any of the o-rings or other seals may need replacing, as may a structural element (e.g., the base plate with center tube, or the spring), but for a typical service action, only the filter element is serviced, e.g., when the fluid is drained from the assembly.

Similar to the previous implementations, the filter assembly 300 has a housing composed of a canister 312 with a removable cover 314 configured to receive a filter element 350 (e.g., a pleated filter element) therein, the housing configured to be attached to an engine. Also included is a support structure that includes a base plate 352 having a plurality of apertures 354 and a perforated center tube 355 which receives the filter element 350 thereon. A drain plug 356 depends from the base plate 352 opposite the center tube 355. A spring 360 is positioned between the support structure and the bottom of the canister 312 when the support structure is positioned in the canister 312.

The housing includes a dirty fluid inlet 321, a filtered fluid outlet 322, a drain 325, all of which are fluidly connected to the engine. FIG. 9 also shows two mounting holes 330 for fastening (e.g., bolting) the filter assembly 300 to an engine. The filter assembly 300 can be designed to be a later-applied, retrofit option to older engines. In alternate designs, the housing may be integrally formed with the engine; for example, cast with other parts of the engine.

As explained above in relation to the other implementations, when the cover 314 is fully closed on the canister 312, the filter element 350 is in in the "use" position, so that used (dirty) fluid enters the housing via the inlet 321, passes through the filter element 350 in a generally radially-inward path, through the filter media to and through the axial center tube 355. From the center tube 355, the now-filtered fluid flows out of the housing 310 via the outlet 322. From the outlet 322, the filtered fluid typically returns to the engine crankcase housing or oil pan.

When the cover 314 is at least partially open (e.g., not in the fully closed position), the filter element 350 is lifted by the spring 360 off of the bottom of the canister 312, opening a fluid path to the drain 325. All fluid, whether dirty (unfiltered) or filtered, has the ability to exit the canister 312 via the drain 325 if the drain 325 is open; it is noted that some fluid may exit via the outlet 322. From the drain 325, the fluid may be collected, e.g., in a waste container. Alternately, the fluid flows from the drain 325 to the engine crankcase housing or oil pan, where all fluid can be removed (drained).

In such a manner, the filter assembly 300 eliminates the need to separately drain fluid from the housing of the filter assembly 300, but rather, the fluid from the filter assembly 300 can drain into the oil pan, from which the fluid from the filter assembly 300 is drained together with the fluid in the oil pan. The fluid can be drained from the oil pan in a standard manner, e.g., via an oil pan drain.

Alternately, whether the fluid from the filter assembly 100, 200 or 300 has drained into the oil pan, the oil and any other fluid in the oil pan can be drained using a "quick change" or "no mess" kit or system.

Figure 11A:
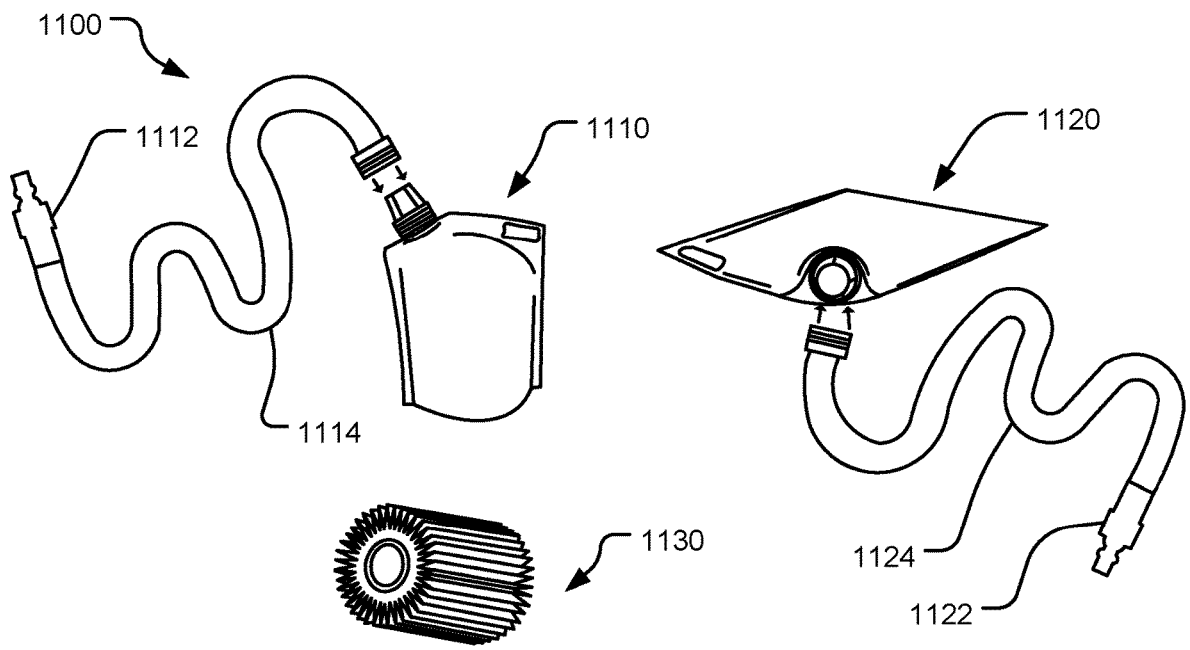
FIG. 11A is a schematic diagram of components of a "quick change" or "no mess" oil change kit.

FIG. 11A shows an example of a "quick change" or "no mess" kit 1100. In this example, the "quick change" or "no mess" kit 1100 includes a container 1110 (e.g., a flexible pouch) with the exact amount of clean fluid needed for the particular engine, and an empty container 1120 (e.g., a flexible pouch). Each container has a fitting 1112, 1122, respectively (e.g., a quick release, quick connect, ¼ turn, bayonet, no mess, etc.) fluidly connected to the inner volume of the container 1110, 1120 via a hose 1114, 1124, respectively, the fittings 1112, 1122 being the same or different. The hose 1114, 1124 may be fixed to the container 1110, 1120 or may be removeable therefrom.

Figure 11B:
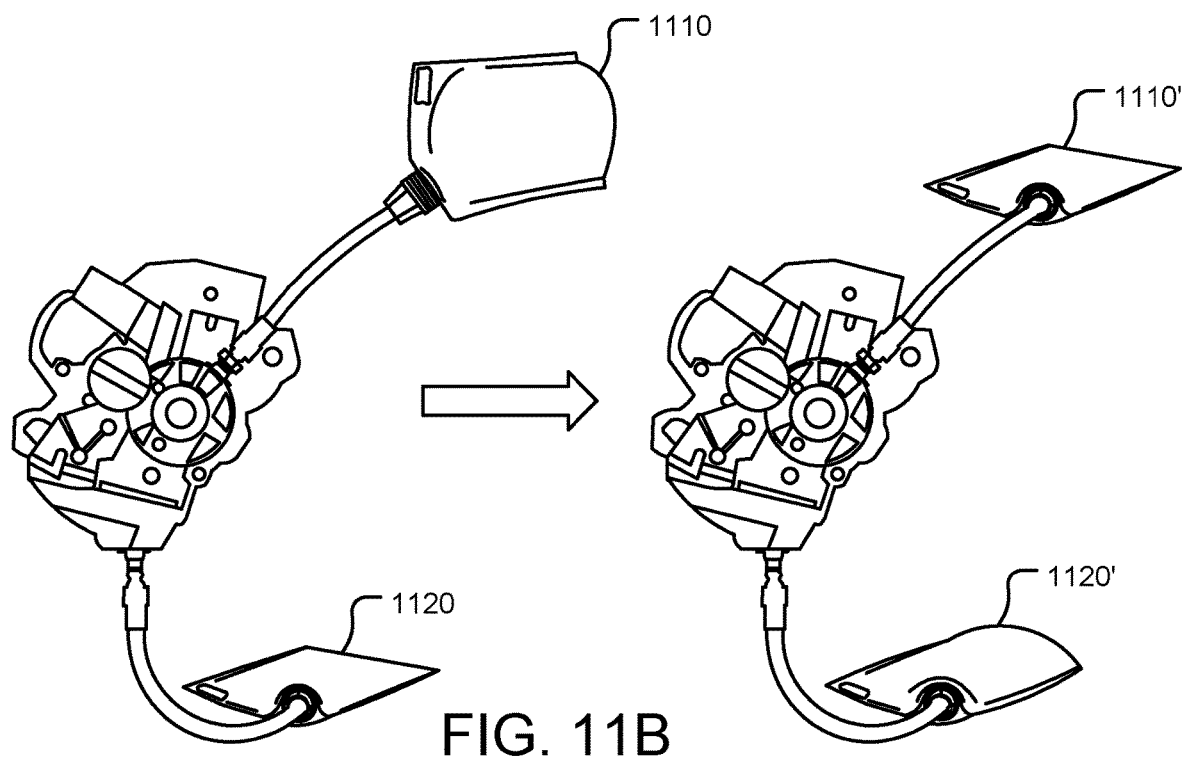
FIG. 11B is a schematic diagram of an engine having its oil changed with a "quick change" or "no mess" kit.

The fitting 1122 of the empty container 1120 is configured to engage with a fitting on the oil pan, and the fitting 1112 of the full container 1110 is configured to engage with a fill port on the engine, as seen in FIG. 11B. In some designs, the full container does not actually physically engage with the fill port, but merely allows transfer of fluid from the container to the fill port and thus to the engine. In some designs, the access (opening) to the fill port includes a dip stick, e.g., integral with the cap. The kit 1100 may also include a filter element 1130, e.g., a pleated filter element such as filter element 150.

Although not shown in FIG. 11A, a plastic bag or other flexible receptacle may be included in the kit 1100, the receptacle being fluid impermeable and sized and shaped to receive the filter element 1130 therein.

FIG. 11B generally shows a method for using the kit 1100 to change an engine's oil. In the first (left) figure, the container 1110 (having the exact amount of clean fluid needed for the engine) is connected to an oil fill connection on the engine and the container 1120 (empty) is connected to an oil pan drain connection on the engine. Oil from the engine is drained from the oil pan into the container 1120, thus filling the container, which is shown in the second (right) figure as container 1120'. Fresh oil from the container 1110 is fed into the engine, thus emptying the container, which is shown in the second (right) figure as container 1110'.

Two particular and detailed methods for changing the fluid (e.g., oil) from an engine having a filter assembly as generally described herein using a "quick change" or "no mess" kit are as follows:

Example Oil Change Procedure:
1. Loosen the cover (e.g., cover 114) from the canister (e.g., canister 112) so that access to the drain (e.g., drain 125) is obtained; it is not necessary to completely remove the cover at this time. Loosening the cover opens the filter-housing drain (e.g., drain 125) and allows the oil in the housing (e.g., housing 110) to drain to the oil pan.
2. Remove the cap on the oil-pan drain port of the engine.
3. Insert the fitting (e.g., fitting 1122) of the empty drain bag (e.g., container 1120) onto or into the oil-pan drain port to drain the used oil.
4. While the oil pan is draining, remove the filter assembly cover (e.g., cover 114) completely, if not already removed.
5. Utilizing the plastic bag in the kit, if present, pull the filter element (e.g., filter element 1130) off the center tube (e.g., center tube 255) and dispose of the plastic bag with filter element inside it.
6. Install a new filter element.
7. Inspect any o-ring(s) and replace if needed.
8. Install cover and tighten.
9. Confirm that the oil pan has finished draining.
10. Remove drain bag fitting and re-install the cap.
11. Remove dip stick and confirm that the oil pan is empty.
12. Remove cap on the new oil pouch (e.g., container 1110) and connect the oil pouch container 1120) via its fitting to the dip stick tube. Alternatively, utilize a fill hose between the new oil pouch and the dip-stick tube.
13. Gently squeeze the pouch until all the oil is drained from the pouch,
14. Confirm that oil level is correct utilizing the dipstick and re-install the dipstick.

Another Example Oil Change Procedure:
1. Loosen the cover (e.g., cover 114) until the threads are un-engaged; it is not necessary to remove the cover completely at this time. Loosening the cover lifts the spring-loaded base plate (e.g., base plate 152) from the bottom of the housing (e.g., housing 110), and allows the oil to from the housing via the drain (e.g., drain 125) to the oil sump.
2. Remove the cap on the oil-pan drain port of the engine.
3. Insert the fitting (e.g., fitting 1122) of the empty drain bag container 1120) into the oil-pan drain port to drain the used oil.
4. While the oil pan is draining, remove the filter housing cover (e.g., cover 114) completely, if not already removed.
5. Utilizing the plastic bag in the kit, if present, pull the filter element (e.g., filter element 1130) off the center tube (e.g., tube 255) and dispose of the plastic bag with filter element inside it.
6. Optional: Lift out the support structure (e.g., including the baseplate (e.g.; plate 152) and center tube) and inspect any o-ring(s); replace o-ring(s) if needed. Re-install the support structure.
7. Install a new filter element.
8. Inspect any o-ring(s) on cover and replace if needed.
9. Install cover (e.g., cover 114) and tighten.
10. Confirm that the oil pan has finished draining.
11. Remove drain bag fitting and re-install the cap.
12. Remove dip stick and confirm that the oil pan is empty.
13. Remove cap on the new oil-pouch and connect the oil pouch (e.g., container 1110) via its fitting to the fitting (e.g., ¼ turn bayonet) on the dip stick tube. Alternatively, utilize a fill hose between the new oil-pouch and the fitting on the dip-stick tube.
14. Gently squeeze the pouch until all the oil is drained from the pouch.
15. Confirm that oil level is correct utilizing the dipstick and re-install the dipstick.

The empty oil pouch (which had the new oil therein) and old o-rings can be disposed of in the trash along with the filter cartridge. The pouch having the used oil can be properly disposed or recycled, for example, placed in a rigid container (e.g., cardboard box) and taken to a recycling station, e.g., to the dealership.

In a variant method, rather than pouring or squeezing the new (clean) oil into the dip stick tube, the new (clean) oil could be poured directedly into the housing of the filter assembly. This could be done before or after a new filter element has been placed therein.

In summary, described herein is a no mess, drainable filter assembly having a drain port to which access is granted by release of the filter housing cap. In some designs, the release of the filter housing cap allows spring-actuated movement of the filter element. For an engine (e.g., internal combustion engine), the filter housing can be drained into the oil pan of the engine, from which all the engine oil is then drained, avoiding the need for separate draining of the filter assembly.

It is to be understood that both the filter assembly and the "quick change" or "no mess" kit can be used for fluids/liquids other than oil in an engine. For example, the filter assembly, drainable into a reservoir, e.g., when changing the filter element, can be used with any type of fluid or liquid and for any system in addition to engines. For example, either or both the filter assembly and the kit could be used with hydraulic fluid, cooling fluid, gasoline, or any fluid that is filtered and that is occasionally drained. The "quick change" or "no mess" kit can be used for any system from which dirty or used fluid is drained and replaced with clean fluid, whether or not a filter is present in the system. Specific examples of systems on which the filter assembly and/or the kit can be used include many numerous types of hydraulic systems, liquid immersion cooling systems, e.g., for data centers, and gear boxes equipped with pressurized lubrication/filtration.

The above specification and examples provide a complete description of the structure and use of exemplary implementations of the invention. The above description provides specific implementations. It is to be understood that other implementations are contemplated and may be made without departing from the scope or spirit of the present disclosure. For example, elements or features of one example, design, embodiment or implementation may be applied to any other example, design, embodiment or implementation described herein to the extent such contents do not conflict. The above detailed description, therefore, is not to be taken in a limiting sense. While the present disclosure is not so limited, an appreciation of various aspects of the disclosure will be gained through a discussion of the examples provided.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the disclosure or the recited claims.

What is claimed is:

1. A filter assembly comprising:
   a housing having a canister and a cover threadedly engageable to the canister, the canister having a fluid inlet, a fluid outlet, and a fluid drain, the fluid drain proximate or in a bottom of the canister;
   a pleated filter element having a plurality of pleats, each pleat sealed together at a top end of the pleat and at a bottom end of the pleat, adjacent pleats not sealed to each other, the filter element not having integral end caps at the top end or the bottom end, the filter element received in the canister; and
   a compression spring positioned between a bottom of the filter element and the bottom of the canister; wherein:
   when the cover is in a first position on the canister, the filter element compresses the spring and closes all fluid paths to the fluid drain, and
   when the cover is in a second position, the spring lifts the filter element and opens a fluid path to the fluid drain.

2. The filter assembly of claim 1, wherein when in the first position, the cover is in a fully closed position, and wherein when in the second position, the cover is not in the fully closed position.

3. The filter assembly of claim 2, wherein when in the second position, the cover is removed from the canister.

4. The filter assembly of claim 1, wherein the drain is offset from a center axis of the filter element and of the canister.

5. The filter assembly of claim 1, wherein the drain is in fluid communication with an engine oil pan.

6. The filter assembly of claim 1 further comprising a drain plug having a first position when the cover is in the first position and a second position when the cover is in the second position, the drain plug sized and shaped to fit within the fluid drain.

7. The filter assembly of claim 1 further comprising a support structure for the filter element, the support structure separate from the filter element, the support structure having a base plate engaging the bottom of the filter element and the bottom end of the pleats and a center perforated tube received within a center of the filter element, the center formed by inner edges of the plurality of pleats.

8. The filter assembly of claim 7, wherein the base plate includes a notch in an outermost periphery of the base plate configured to engage with a protrusion on an inner wall of the canister.

9. A filter assembly comprising:
   a housing having a canister and a cover;
   a pleated filter element having a plurality of pleats extending from a top end of the filter element to a bottom end of the filter element, each of the top end and the bottom end not having an integral end cap, and each pleat of the plurality of pleats sealed at the top end and the bottom end and adjacent pleats not sealed to each other;
   a base plate received in the canister and having a plurality of apertures therethrough and a center perforated tube, the pleated filter element seated on the base plate and surrounding the center perforated tube, the base plate and center perforated tube separable from the pleated filter element;
   a compression spring positioned between the bottom end of the filter element and a bottom of the canister;

a fluid inlet into the canister, a fluid outlet out from the canister in-line with the center perforated tube, and a fluid drain proximate or in the bottom of the canister, wherein:
when the filter element compresses the spring, the fluid drain is closed, and
when the spring lifts the filter element, the fluid drain is open.

10. The filter assembly of claim 9, wherein when the filter element compresses the spring, the cover is in a fully closed position, and wherein when the spring lifts the filter element, the cover is not in the fully closed position.

11. The filter assembly of claim 9, wherein the fluid drain is offset from a center axis of the filter element and of the center perforated tube.

12. The filter assembly of claim 9 further comprising a drain plug extending from the base plate opposite the center perforated tube, the drain plug sized and shaped to fit within the fluid drain.

13. The filter assembly of claim 9, wherein the fluid drain is in fluid communication with an engine oil pan.

14. The filter assembly of claim 9, wherein the base plate includes a notch in an outermost periphery of the base plate, and the canister includes a protrusion on an inner wall of the canister, the protrusion configured to engage with the notch.

15. A filter assembly comprising:
a housing having a canister and a cover threadedly engageable with the canister; and
a pleated filter element having a plurality of pleats, each pleat sealed together at a top end of the pleat and at a bottom end of the pleat, the filter element not having integral end caps at the top end or the bottom end and adjacent pleats not sealed to each other, with the filter element received in an interior of the canister and seated around a perforated center tube;
the canister having a fluid inlet, a fluid outlet aligned with a center axis of the filter element and of the center perforated tube, and a fluid drain proximate or in a bottom of the canister and offset from the center axis of the filter element and of the center perforated tube, the fluid drain fluidly connected to an engine oil pan;
wherein:
when the cover is in a fully closed position on the canister, access to the fluid drain is closed, and
when the cover is in a not fully closed position, with the cover partially threadedly engaged with the canister, access to the fluid drain is open providing a fluid pathway to the engine oil pan.

16. A method comprising:
inputting dirty fluid into a filter assembly canister having a pleated filter element therein, the filter element having a plurality of pleats, each pleat sealed together at a top end of the pleat and at a bottom end of the pleat, the filter element not having integral end caps at the top end or the bottom end and adjacent pleats not sealed to each other;
passing the dirty fluid through the filter element to provide a filtered fluid;
removing the filtered fluid from the canister via an outlet; and
after removing the filtered fluid, rotating a cover of the filter assembly canister from a fully closed position to a not fully closed position without removing the cover fully from the canister to open a fluid path for any remaining dirty fluid and filtered fluid from the canister to a drain offset from a center axis of the filter element and connected to an engine oil pan, with the cover remaining on the canister and the filter element remaining in the canister.

17. The method of claim 16 further comprising, after opening the fluid path from the canister to the drain, removing the cover fully and removing the filter element from the canister.

18. The method of claim 17 further comprising, after removing the filter element from the canister, removing the filter element from a center tube and base plate.

\* \* \* \* \*